United States Patent Office.

HENRY LEFEVRE AND JOSEPH McGUIRE, OF LANCASTER, PENNSYLVANIA.

*Letters Patent No. 70,342, dated October 29, 1867.*

IMPROVED COMPOUND FOR STOPPING LEAKS IN STEAM-BOILERS.

*The Schedule referred to in these Letters Patent and making part of the same.*

TO ALL WHOM IT MAY CONCERN:

Be it known that we, HENRY LEFEVRE and JOSEPH McGUIRE, of Lancaster, in the county of Lancaster, in the State of Pennsylvania, have by patient perseverance discovered or invented a new and effectual Compound for Stopping the Leaking of Boilers, while in use either with a locomotive or stationary steam engine; and we do hereby declare that the following is a full and exact description thereof.

Being both engaged as engineers for a number of years, and knowing the annoyance of leaky flues or seams in boilers by experience, we have with others tried numerous means resorted to, such as bran, horse-droppings, and the like, which find their way to the leak and produce a temporary stoppage. Having now jointly tested our composition for upwards of a year past, under a diversity of circumstances, we have found the results in efficacy and durability far to exceed our expectations, and in recently inspecting a boiler which had been condemned as being worthless, the leakage of which was stopped by our composition, and the same continued in use, doing good service for a year after, when, for other reasons, it was put under repair, it gave us an opportunity to witness the wonderful hardness and close adhesion of our composition, actually cementing the seams so effectually as to require the cold chisel to remove the incrustation of this compound, the philosophy of which we may not fully understand unless combined with the lime, aided by the heat and pressure and other conditions. The fact is patent to many, and the compound too valuable to be confined to us alone, however simple. The silica in the bran, with the albumen partially dissolved, may have an agency with the lime in forming a silicate.

The compound we find the most efficient as to proportions consists in the use of one quart of well-ground common plaster of Paris (gypsum, sulphate of lime,) in its raw state, intimately mixed with two quarts of wheat bran, (both common and well known, so that a sample is not needed.) This composition, when thrown into the boiling water, seems by some affinity to find its way to the leak wherever it exists, whether in the flues, around the stay-bolts, rivets, or seams, and stops a leak of ordinary kind as effectually as caulking or other mechanical means in use, without loss of time or stoppage in the use of the boiler. Thus much valuable time is gained, and heavy labor and expense avoided. Since it has been satisfactorily proved that it permanently stops the leaky places, if theory fails to see the why and wherefore, the fact nevertheless remains indisputable.

We are aware that bran is in common use among engineers, and do not claim it separately. We are not aware of its having ever been used combined with lime or with ground gypsum. The gypsum, by some chemical union within the boiler with the bran, combines in a manner, as it is floated to the leak, where it lodges and impinges itself by the pressure so as to pack tightly, and becomes petrified into a cement of the most tenacious and strongly adhering character. It is this discovery we deem of value and desire to secure by Letters Patent, resulting, after numerous tests and trials, in overcoming a great annoyance to those running engines.

What we claim as our invention, and desire to secure by Letters Patent, is—

The composition set forth, combined substantially in manner and for the purpose specified.

HENRY LEFEVRE,
JOSEPH McGUIRE.

Witnesses:
WM. B. WILEY,
JACOB STAUFFER.